(12) United States Patent
Takahashi et al.

(10) Patent No.: US 7,443,516 B2
(45) Date of Patent: Oct. 28, 2008

(54) OPTICAL-DISTORTION CORRECTING APPARATUS AND OPTICAL-DISTORTION CORRECTING METHOD

(75) Inventors: Fumiyuki Takahashi, Kawasaki (JP); Takashi Fuse, Kawasaki (JP); Hiroyuki Tsukahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 260 days.

(21) Appl. No.: 11/287,229

(22) Filed: Nov. 28, 2005

(65) Prior Publication Data
US 2006/0187463 A1    Aug. 24, 2006

(30) Foreign Application Priority Data
Feb. 18, 2005    (JP) ............... 2005-043106

(51) Int. Cl.
*G01B 11/02*    (2006.01)
(52) U.S. Cl. .................................... 356/515
(58) Field of Classification Search .............. 356/515, 356/489, 495; 355/53
See application file for complete search history.

(56) References Cited

U.S. PATENT DOCUMENTS

| | | | | |
|---|---|---|---|---|
| 1,824,668 A | * | 9/1931 | Hasselkus et al. ........... | 356/515 |
| 3,836,256 A | * | 9/1974 | Peters ........................ | 356/508 |
| 5,355,210 A | * | 10/1994 | Keren et al. ................. | 356/124 |
| 5,940,181 A | * | 8/1999 | Tsubono et al. ............. | 356/508 |
| 6,266,147 B1 | * | 7/2001 | Naulleau ..................... | 356/515 |
| 6,312,373 B1 | * | 11/2001 | Ichihara ...................... | 356/515 |
| 6,469,791 B1 | * | 10/2002 | Stenton ....................... | 356/458 |
| RE38,113 E | * | 5/2003 | Nishi et al. ................... | 430/22 |
| 2001/0026367 A1 | * | 10/2001 | Magome ..................... | 356/521 |
| 2007/0201037 A1 | * | 8/2007 | Wu et al. ..................... | 356/515 |

FOREIGN PATENT DOCUMENTS

| | | |
|---|---|---|
| JP | 7-260420 | 10/1995 |
| JP | 2717407 | 11/1997 |
| JP | 2001-124534 | 5/2001 |
| JP | 2001-174213 | 6/2001 |

* cited by examiner

*Primary Examiner*—Tarifur R Chowdhury
*Assistant Examiner*—Jonathon D Cook
(74) *Attorney, Agent, or Firm*—Westerman, Hattori, Daniels & Adrian, LLP.

(57) ABSTRACT

A reference-height calculating unit calculates an original height of a distortion detecting mirror when a distortion detecting mirror and a reference mirror are set in parallel to each other. A height measuring unit measures mirror heights when the distortion detecting mirror is tilted in directions of an X axis and a Y axis. A contour-line calculating unit calculates a pair of contour lines based on the mirror heights. An intersection calculating unit calculates an intersection of the contour lines. A storing unit stores coordinates to which height of predetermined coordinates are moved by distortion in a correction table. A distortion correcting unit corrects the distortion based on the correction table.

9 Claims, 15 Drawing Sheets

WITHOUT DISTORTION

WITH DISTORTION

FIG.2
WITHOUT DISTORTION 3
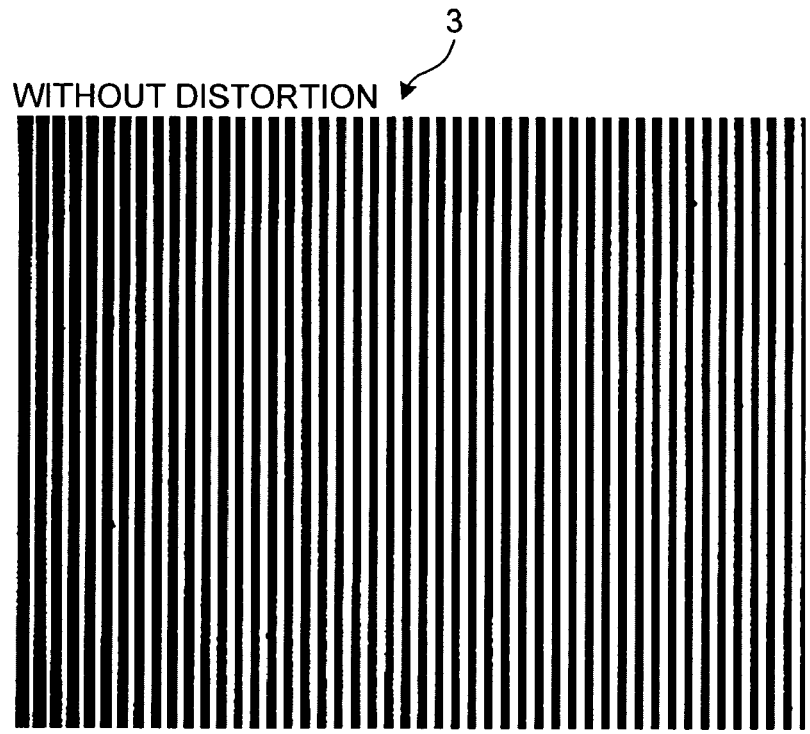
WITH DISTORTION 4
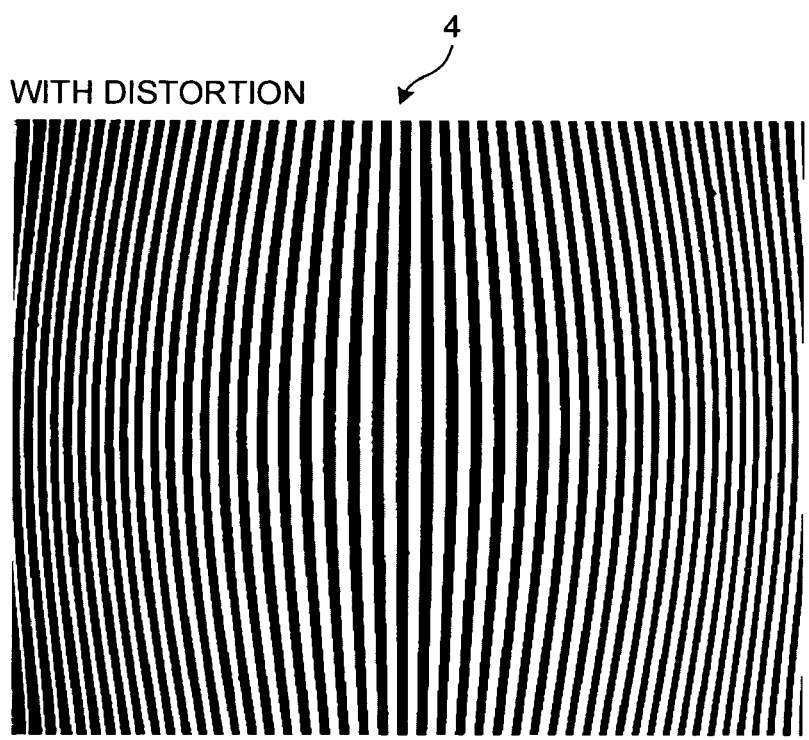

$$\delta = \frac{d}{L+d} h$$

DISTORTION DETECTING MIRROR 13

RELATIVE ANGLE ZERO POSITION

DISTORTION DETECTING MIRROR 13

RELATIVE ANGLE ZERO POSITION

DISTORTION DETECTING MIRROR 13

RELATIVE ANGLE ZERO POSITION

FIG.13
BEFORE DISTORTION
CORRECTION
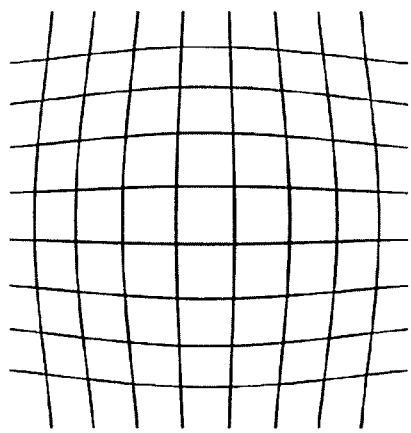
CORRECTION TABLE
12a
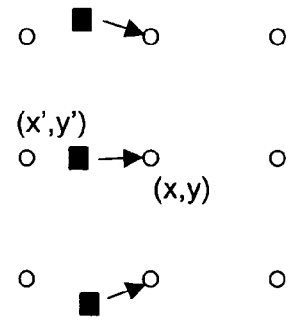
AFTER
DISTORTION
CORRECTION
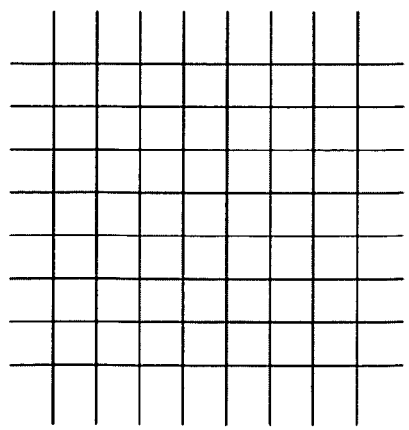

OPTICAL-DISTORTION CORRECTING APPARATUS AND OPTICAL-DISTORTION CORRECTING METHOD

CROSS-REFERENCE TO RELATED APPLICATIONS

This application is based upon and claims the benefit of priority from the prior Japanese Patent Application No. 2005-043106, filed on Feb. 18, 2005, the entire content of which is incorporated herein by reference.

BACKGROUND OF THE INVENTION

1. Field of the Invention

The present invention relates to a technology for correcting an optical distortion that occurs in an optical system image.

2. Description of the Related Art

Conventionally, there are optical measurement apparatuses that perform measurement based on an optical image, such as an interferometer and a length measuring machine. In such optical measurement apparatuses, two-dimensional optical distortion is caused due to distortion in an optical system in imaging such an optical image. The optical distortion causes deterioration in measurement accuracy.

With such reason, a method of measuring the optical distortion and an apparatus for correcting measured optical distortion have been proposed. For example, in one of the method, a regular reference pattern, such as a tetragonal lattice, is captured with a charge-coupled device (CCD) camera, and the optical distortion is measured based on deviation from the reference pattern to measure is widely known.

Japanese Patent No. 2717407 discloses an apparatus for correcting optical distortion. The apparatus detects two-dimensional deformation of a moiré fringe caused by superimposing a deformed lattice that is obtained by projecting a reference lattice on a flat measurement object, removes the optical distortion measured.

Measurement of the optical distortion by the conventional technology is based on detection of two-dimensional deformation of an image pattern or a moiré fringe. However, since detection accuracy of such deformation is low, measurement accuracy for the optical distortion cannot be sufficiently high for performing highly accurate interference measurement and dimensional measurement.

In performing two-dimensional positional detection for an image pattern or a moiré fringe from an image optical image, the positional detection is performed based on a change in luminance in the image pattern or the moiré fringe. However, since brightness of an optical system is not uniform in the optical image, an offset component and a modulation component of brightness occur in the optical image.

Accuracy of two-dimensional positional detection for the image pattern or the moiré fringe is limited to a sub-pixel order by influences of these components. Therefore, measurement accuracy for optical distortion based on detection of two-dimensional deformation is also limited to the equivalent degree.

SUMMARY OF THE INVENTION

It is an object of the present invention to at least solve the above problems in the conventional technology.

An apparatus according to one aspect of the present invention is for correcting optical distortion, and includes a mirror control unit configured to control a relative angle between optical axes of a distortion detecting mirror and a reference mirror; a height detecting unit configured to detect a measurement height of a surface of the distortion detecting mirror by measuring positions of respective lattice points on the surface, the measurement height from a reference surface that is a surface substantially parallel to the reference mirror, wherein the positions are measured at a plurality of relative values; and a correcting unit configured to correct the optical distortion based on the measurement height.

A method according to another aspect of the present invention is of correcting optical distortion, and includes controlling a relative angle between optical axes of a distortion detecting mirror and a reference mirror; detecting a measurement height of a surface of the distortion detecting mirror by measuring positions of respective lattice points on the surface, the measurement height from a reference surface that is a surface substantially parallel to the reference mirror, wherein the positions are measured at a plurality of relative values; and correcting the optical distortion based on the measurement height.

A computer-readable recording medium according to still another aspect of the present invention stores therein a computer program for realizing the method according to the above aspect.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 2 is a schematic for illustrating an influence of distortion on interference fringes;

FIG. 13 is a schematic for explaining optical distortion correction according to a correction table;

DETAILED DESCRIPTION OF THE PREFERRED EMBODIMENTS

Exemplary embodiments of the present invention are explained in detail below with reference to the accompanying drawings. Note that the present invention is not limited to the embodiments.

Figure 1:
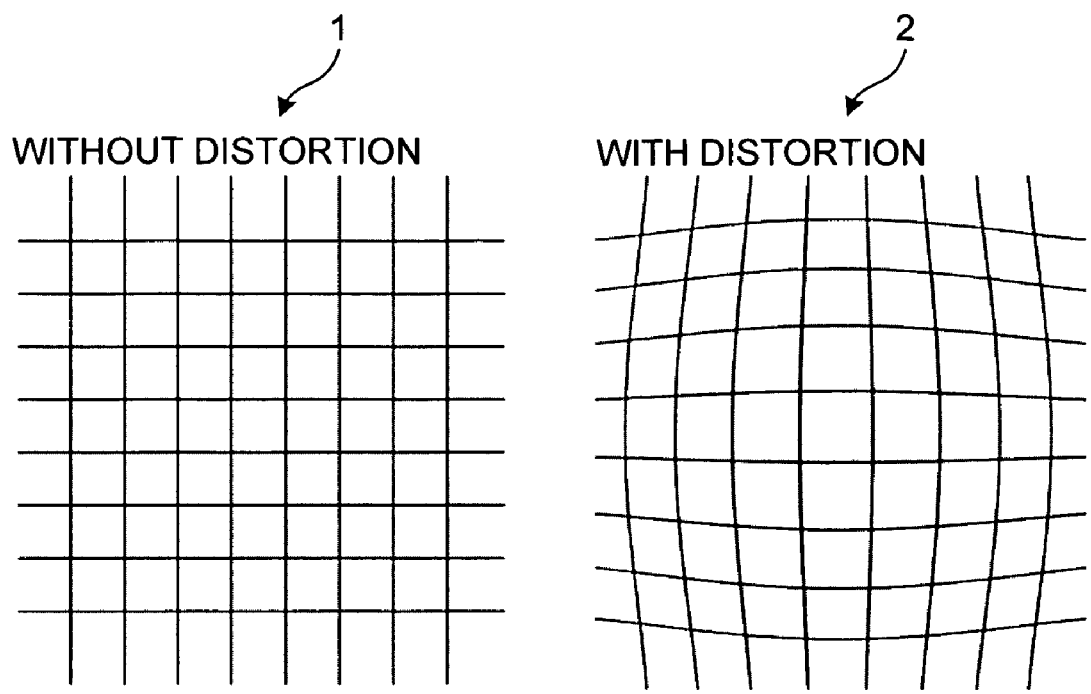
FIG. 1 is a schematic for illustrating distortion.

FIG. 1 is a schematic for explaining distortion of an optical system that images an optical image. A square lattice pattern 1 becomes a distorted pattern 2 as shown in FIG. 1 due to optical distortion (hereinafter, "distortion") of such an optical system. An optical-distortion correcting apparatus and an optical-distortion correcting method according to the present invention precisely measure and correct such distortion. As a characteristic of the optical-distortion correcting apparatus and the optical-distortion correcting method, the optical-distortion correcting apparatus and the optical-distortion correcting method measure height of a tilted mirror surface with a high-precision interferometry and precisely measure and correct such distortion based on the height of the mirror surface measured.

Figure 3:
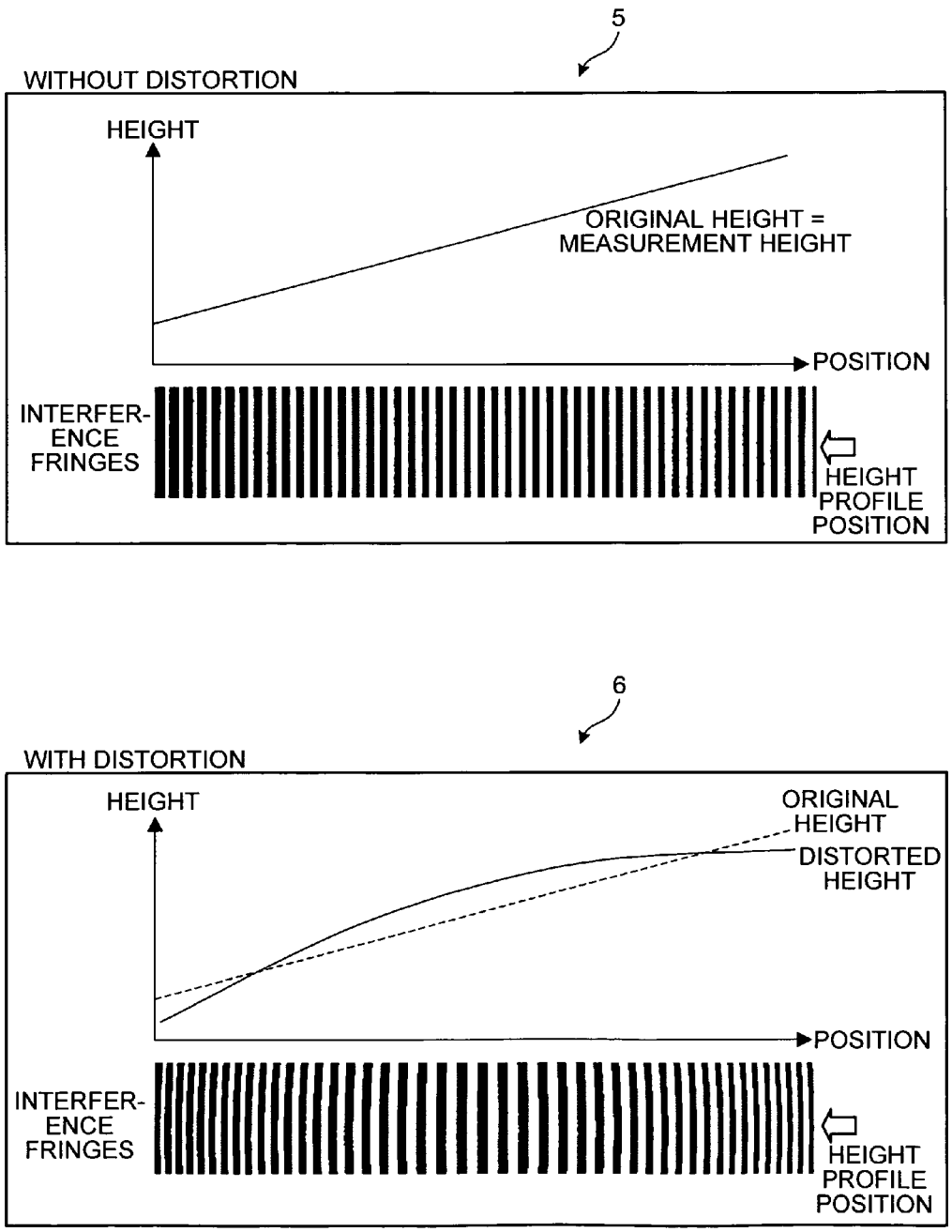
FIG. 3 is a schematic for illustrating a relation between distortion and height.
Figure 4:
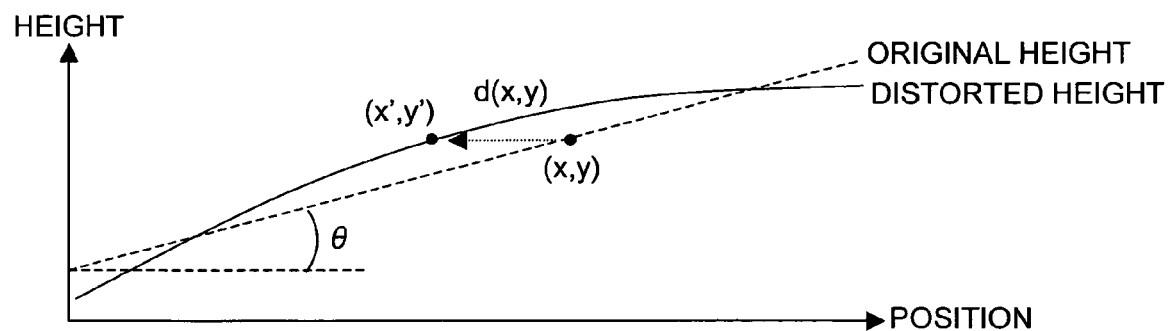
FIG. 4 is a schematic for illustrating a relation between distortion and height.

FIG. 2 is a schematic for illustrating an influence of distortion on interference fringes when height of the tilted surfaced is measured. FIG. 3 is a schematic for illustrating a relation between distortion and height. FIG. 4 is a schematic for illustrating the relation between distortion and height in detail using a coordinate system.

Note that, in FIG. 3, a height profile on one line indicated by an arrow in FIG. 3 is shown for interference fringes in a central part of diagrams 3 and 4 shown in FIG. 2. A height profile 5 corresponds to "interference fringes without distortion" shown with the diagram 3. A height profile 6 corresponds to "interference fringes with distortion" shown with the diagram 4.

As shown in FIG. 3, a relation between two-dimensional (X and Y) distortion and height (Z) when the tiled mirror is measured with interference is as described below. When there is no distortion as in the profile 5, a mirror height coincides with original height of the mirror. However, when interference fringes are distorted as in the profile 6, a result of height measurement is also distorted according to the distortion of the interference fringes.

As shown in FIG. 4, distortion of height appears as a change in a height position of an arbitrary pixel (x, y). Since height d (x, y) in the pixel (x, y) is moved to a pixel (x', y') because of distortion, height is measured in a distorted manner. Therefore, it is possible to detect a distortion amount of an entire image by precisely detecting a position of a destination to which original height is moved in each pixel. Note that, in FIG. 4, for simplicity of explanation, it is assumed that distortion occurs only in a direction X. "θ" indicates a tilt of a mirror surface.

Figure 5:
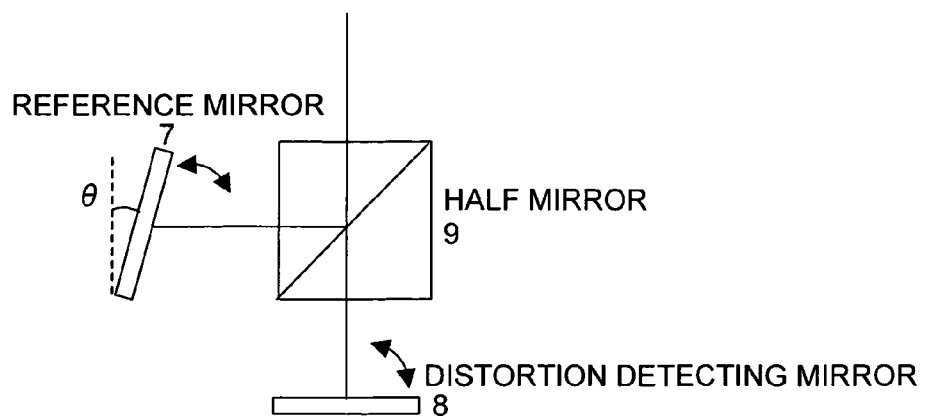
FIG. 5 is a schematic of a Michelson interferometer and a mirror angle.

FIG. 5 is a schematic of a Michelson interferometer and a mirror angle. Note that, although the Michelson interferometer is explained as an example, other interference optical systems may be used.

As shown in FIG. 5, lights reflected by a distortion detecting mirror 8 and a reference mirror 7 overlap and interfere each other on a half mirror 9. Note that a relative angle θ of the distortion detecting mirror 8 and the reference mirror 7 shown in FIG. 5 is equivalent to the tilt θ of the height profile shown in FIG. 4.

To improve detection accuracy for distortion, a state of the relative angle θ of the distortion detecting mirror 8 and the reference mirror 7 is important.

Figure 6A:
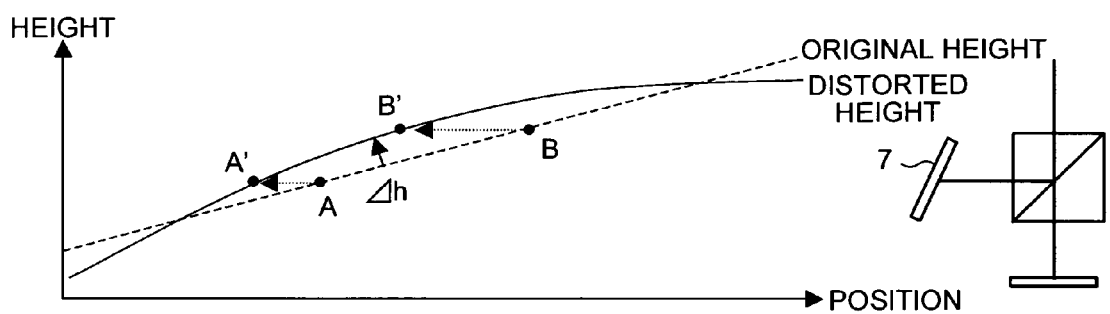
FIG. 6A is a schematic for illustrating a relation between distortion and height when a relative angle of a mirror is large.
Figure 6B:
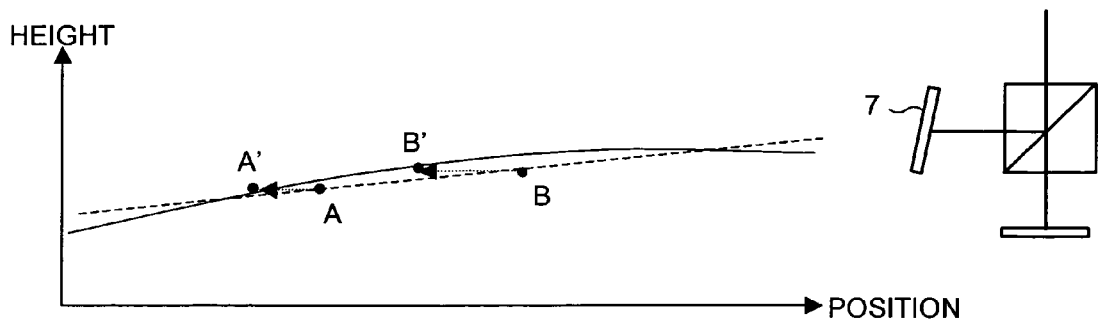
FIG. 6B is a schematic for illustrating a relation between distortion and height when a relative angle of the mirror is small.
Figure 6C:
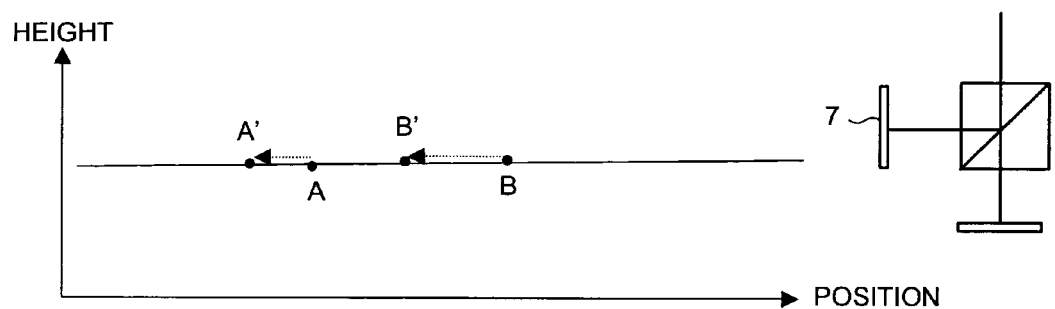
FIG. 6C is a schematic for illustrating a relation between distortion and height when a relative angle of the mirror is zero degree.
Figure 6D:
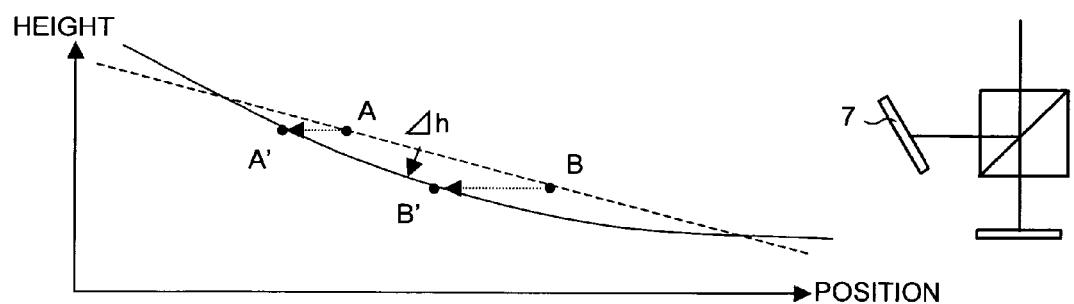
FIG. 6D is a schematic for illustrating a relation between distortion and height when a relative angle of the mirror is a negative value.

FIG. 6A is a schematic for illustrating a relation between distortion and height when a relative angle of a mirror is large. FIG. 6B is a schematic for illustrating a relation between distortion and height when a relative angle of the mirror is small. FIG. 6C is a schematic for illustrating a relation between distortion and height when a relative angle of the mirror is 0 degree. FIG. 6D is a schematic for illustrating a relation between distortion and height when a relative angle of the mirror is minus.

As shown in FIGS. 6A to 6D, measurement height has a larger deviation from an original mirror shape in proportion to the relative angle θ. To distinguish distortion amounts at different two points (a point A and a point B), it is necessary to distinguish a destination to which height of the point A is moved and a destination to which height of the point B is moved. Thus, as shown in FIGS. 6A and 6D, accuracy of distortion detection is improved as the relative angle θ of the reference mirror 7 and the distortion detecting mirror 8 is set larger. Conversely, as shown in FIG. 6C, accuracy of distortion detection is minimal when the relative angle θ is substantially zero.

Therefore, in performing distortion detection, angles of both or one of the reference mirror 7 and the distortion detecting mirror 8 are adjusted to make the relative angle θ large (to make intervals of interference fringes as dense as possible).

It is possible to estimate detection accuracy (detection sensitivity) S of distortion as indicated by the following equation where height detection accuracy of an interference system is σ, a difference of heights at the point A and the point B is h, and a distance between the point A and the point B is L.

$$S = L\sigma/h \quad (1)$$

For example, when a mirror angle is set to a relative angle causing interference fringes for one wavelength in two pixels, $h=\lambda/4$. When it is assumed that σ is $\lambda/500$ and the distance L between the point A and the point B is one pixel, according to Equation 1, the detection accuracy S takes a value smaller than 1/100. Therefore, it is possible to detect distortion at accuracy higher than 1/100 pixel.

As indicated by Equation 1, detection accuracy for distortion is improved by setting the relative angle of the mirror large (setting the height difference h large) and setting the height detection accuracy σ small (increasing the height detection accuracy). In the optical-distortion correcting method according to the present invention, the high-precision interferometry is used for measurement of a mirror height. Note that the high-precision interferometry is a technology that can precisely detect a phase from the interference fringe image shown in FIG. 2.

When luminance of the interference fringes shown in FIG. 2 is assumed to be I(x, y), the interference fringes are represented by the following equation.

$$I(x,y) = A(x,y) + B(x,y)\cos(\phi(x,y)) \quad (2)$$

Note that, in Equation 2, ($\phi$(x, y) is a phase difference between the reference mirror 7 and a height measurement object (in this embodiment, the distortion detecting mirror 8). A(x, y) is a brightness offset component of the optical system. B(x, y) is a brightness modulation component of the optical system. When it is assumed that the reference mirror 7 is completely flat, (φ(x, y) takes a value proportional to a change in height of the distortion detecting mirror 8.

Figure 7:
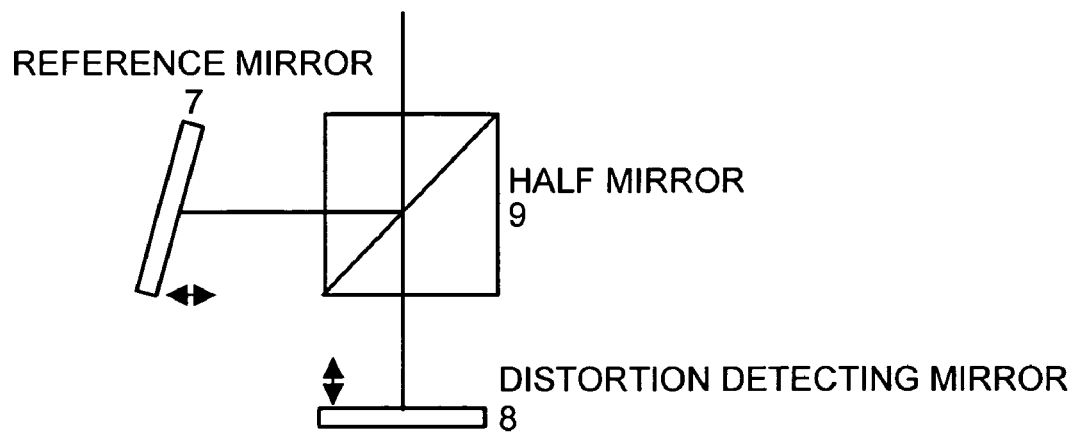
FIG. 7 is a schematic for illustrating a phase shift method.

Usually, since A(x, y) and B(x, y) are not 0, A(x, y) and B(x, y) are error factors in calculating (φ(x, y) from imaged interference fringes I(x, y). A phase shift method known as one of the high-precision interferometry can efficiently eliminate influence of A(x, y) and B(x, y). FIG. 7 is a diagram for explaining the phase shift method.

As shown in FIG. 7, such a phase shift method can cancel influences of A(x, y) and B(x, y) and calculate (φ(x, y) based on more than one interference image obtained by finely moving the reference mirror 7 or the distortion detecting mirror 8 in an optical axis direction with a piezo-element or the like. Note that, although the phase shift method is used in this embodiment, other precision interferometry technologies like a space carrier method may be used.

In the optical-distortion correcting method according to the present invention, height of a tilted mirror surface is measured using the high-precision interferometry technology such as the phase shift method. Thus, it is possible to measure (φ(x, y), that is, a mirror height that is not affected by influences of the brightness offset component A(x, y) and the brightness modulation component B(x, y) that are error factors in detecting a reference pattern a position of a moiré fringe. It is possible to perform distortion measurement more precise than the conventional technology by calculating a distortion amount using the mirror height measured.

In calculating distortion, as shown in FIG. 4, a position to which an original height of the distortion detecting mirror 8 in the pixel (x, y) is moved is calculated based on distorted height data. Therefore, to perform precise distortion measurement, it is necessary to accurately learn the original mirror height in advance. Note that the original mirror height is a mirror height that is detected by an optical system that has almost no distortion. A value of the mirror height is a value including influences of not only a shape of the distortion detecting mirror 8 but also a shape of the reference mirror 7 and a height detection error of an interference optical system.

In measuring a mirror height, briefly, it is also possible to assume planarity the distortion detecting mirror 8 and the reference mirror 7 and use an ideal straight line (actually, plane) like a dotted line in FIG. 4 as the original mirror height. However, if there is an error in the assumed height, the error causes a distortion detection error. Actually, other than deviation from the ideal plane of the distortion detecting mirror 8, deviation of the reference mirror 7 and a height error in an interference system are superimposed, it is not preferable to expect complete planarity in the original mirror height.

Figure 8:
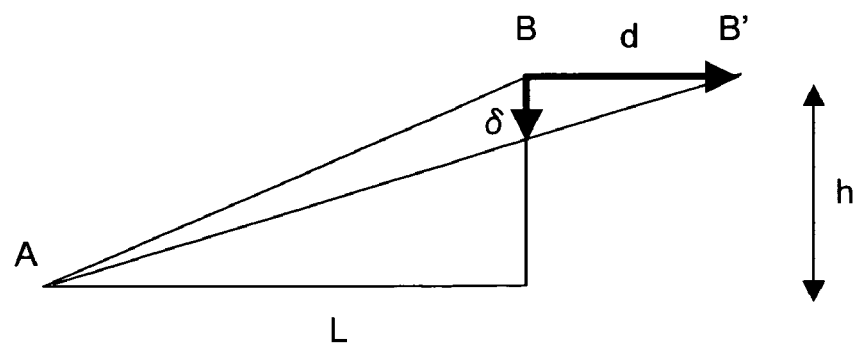
FIG. 8 is a schematic for illustrating a height error.

Thus, in the optical-distortion correcting method according to the present invention, as shown in FIG. 6C, height measurement is performed in the state in which the relative angle θ of the distortion detecting mirror 8 and the reference mirror 7 is almost 0 to estimate an original mirror height. An error in the original mirror height is explained with reference to FIG. 8. FIG. 8 is a schematic for explaining such a height difference.

As shown in the figure, when a height difference between a point A and a point B is h, a distance between the point A and the point B is L, a distance between the point B and a point B' to which the point B is shifted by distortion is d, and an amount of a change in height at the point B due to distortion is δ, δ is represented by the following equation.

$$\delta = (d/(L+d))h \quad (3)$$

As indicated by Equation 3, since δ is proportional to h, for example, when a mirror is tilted to increase h as shown in FIGS. 6A and 6D, a value of δ increases. Conversely, when a tile of the mirror is reduced to zero, an influence of distortion is minimized and the height error δ is (d/(L+d)) times as large as the original mirror height h. For example, when distortion between A and B is 10 percent, since d=0.1×it is possible to calculate an original mirror height with an error of about 10 percent. Note that, when distortion increases, a height detection error increases to deteriorate distortion detection accuracy.

Thus, in the optical-distortion correcting method according to the present invention, large distortion is detected by the conventional method in advance and rough correction is performed before detection of an original mirror height. After performing such correction, a position $\theta_0$ where the relative angle θ of the mirror is 0 is detected accurately. Therefore, in the optical-distortion correcting method according to the present invention, the $\theta_0$ position is searched by detecting a change in a height shape detected by changing the relative angle θ of the mirror in a plus direction and a minus direction.

As shown in FIGS. 6A and 6D, a sign of a shape error with a mirror average position as a reference is opposite when a mirror relative angle is plus and when a mirror relative angle is minus. Therefore, to find the $\theta_0$ position, it is sufficient to detect an angle at which the shape error is minimized while changing a mirror angle. The $\theta_0$ position obtained in this way is set as such a relative angle. An original mirror height (a mirror reference height) is calculated by accurately measuring a mirror height using the high-precision interferometry technology such as the phase shift method.

Figure 9:
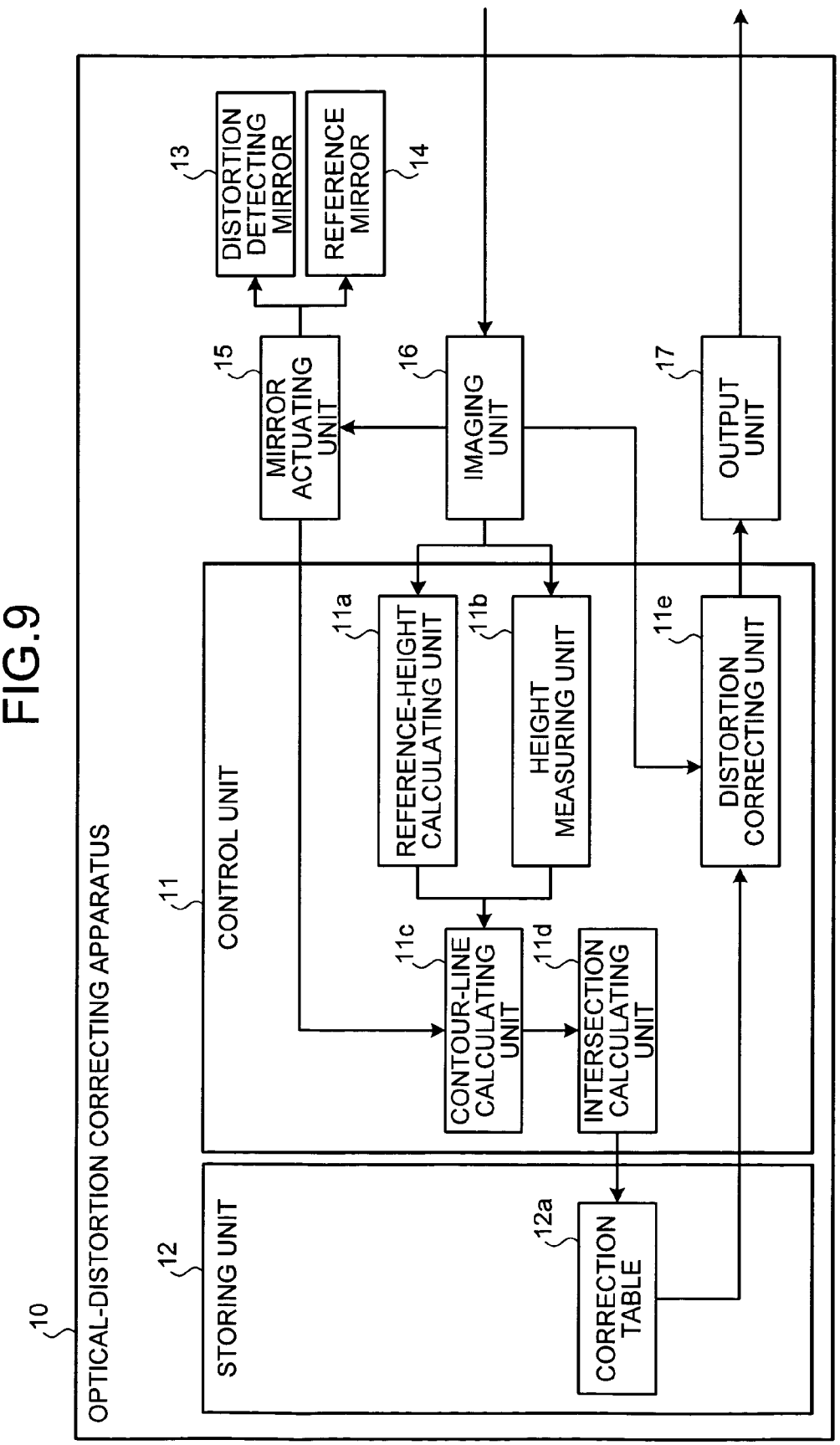
FIG. 9 is a block diagram of an optical-distortion correcting apparatus according to an embodiment of the present invention.

FIG. 9 is a block diagram of the optical-distortion correcting apparatus according to this embodiment. As shown in the figure, an optical-distortion correcting apparatus 10 includes a control unit 11, a storing unit 12, a distortion detecting mirror 13, a reference mirror 14, a mirror actuating unit 15, an imaging unit 16, and an output unit 17.

The control unit 11 includes a reference-height calculating unit 11a, a height measuring unit 11b, a contour-line calculating unit 11c, an intersection calculating unit 11d, and a distortion correcting unit 11e. The storing unit 12 includes a correction table 12a.

The control unit 11 removes distortion from image data imaged by the imaging unit 16 and outputs the image data with distortion removed to the output unit 17. Specifically, first, the control unit 11 calculates an original height of the distortion detecting mirror 13 in a state in which the distortion detecting mirror 13 and the reference mirror 14 are set substantially perpendicular to each other.

The control unit 11 measures a distortion amount in an X direction and a distortion amount in a Y direction in an X-Y coordinate system provided on the image data, respectively, by tilting the distortion detecting mirror 13 around a Y axis and an X axis. The control unit 11 combines the distortion amounts to calculate a distortion amount in such an X-Y coordinate system. The control unit 11 stores the distortion amount calculated in the correction table 12a of the storing unit 12. The control unit 11 corrects distortion of the imaged image data by using a value stored in the correction table 12a.

Figure 11A:
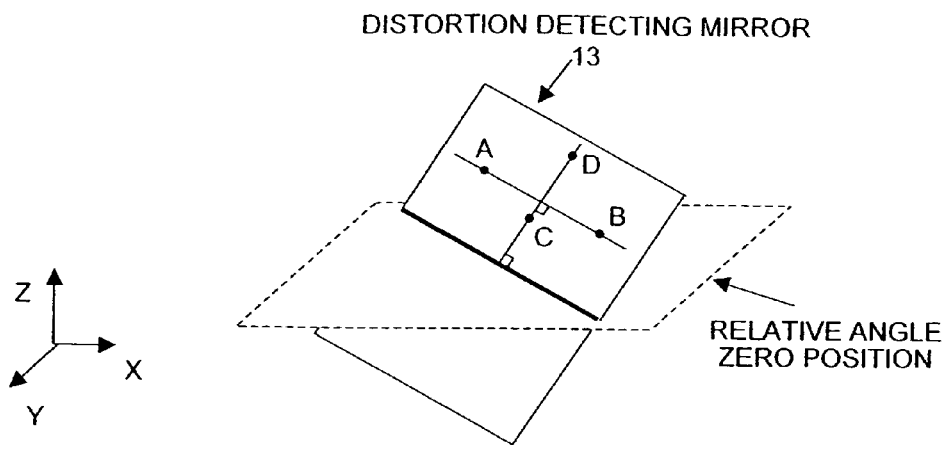
FIG. 11A is a schematic for explaining mirror rotation.
Figure 11B:
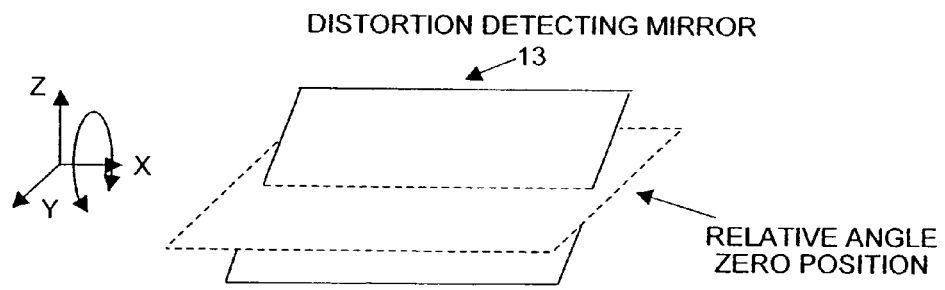
FIG. 11B is a schematic of a distortion detecting mirror rotated around an X axis.
Figure 11C:
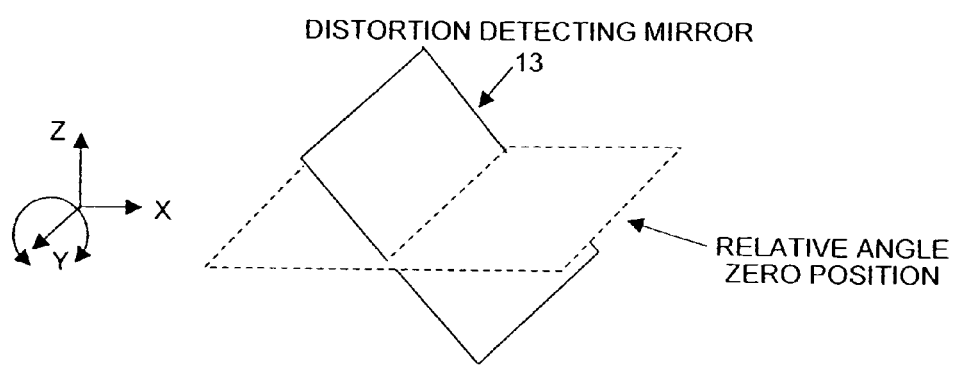
FIG. 11C is a schematic of the distortion detecting mirror rotated around a Y axis.

FIG. 11A is a schematic for explaining mirror rotation. FIG. 11B is a schematic of a distortion detecting mirror rotated around an X axis. FIG. 11C is a schematic of the distortion detecting mirror rotated around a Y axis. Note that a plane indicated by a dotted line in FIGS. 11A to 11C (hereinafter, "imaginary plane") is indication of a virtual image of a surface of the reference mirror 14, which is formed by the half mirror when the relative angle θ is zero. A coordinate system shown in the figures is an orthogonal coordinate system.

As shown in FIG. 11A, a portion where the distortion detecting mirror 13 and the imaginary plane crosses when the distortion detecting mirror 13 is tilted (a portion where an optical path difference is 0, that is, $\phi(x, y)=0$ in Equation 2) is represented by one line (straight line or curved line). A point C and a point D on a straight line perpendicular to this line have heights from the imaginary plane different from each other. Therefore, it is possible to detect distortion in a direction perpendicular to such a line. However, there is no height difference between a point A and a point B on a straight line parallel to such a line. Therefore, it is impossible to detect distortion in a direction parallel to such a line.

Thus, in this embodiment, as shown in FIGS. 11B and 11C, a distortion amount in an entire area of the X-Y coordinate system by tilting the distortion detecting mirror 13 in two directions, respectively.

As shown in FIG. 11B, distortion amounts in directions other than a direction parallel to the X axis are measured by rotating the distortion detecting mirror 13 around the X axis to measure heights in respective positions of a mirror surface. As shown in FIG. 11C, distortion amounts in directions other than a direction parallel to the Y axis are measured by rotating the distortion detecting mirror 13 around the Y axis to measure heights in respective positions on the mirror surface.

In this way, distortion detection is performed at two relative angles at which straight lines (curved lines), where the distortion detecting mirror 13 and the reference mirror 14 (the imaginary plane) cross, are orthogonal to each other. Thus, it is possible to precisely perform distortion detection for an entire surface of a CCD field. Note that it is also possible to perform distortion detection at two relative angles at which such straight lines (curved lines) are not orthogonal to each other. However, when the two straight lines (curved lines) are nearly parallel to each other, distortion detection accuracy in the straight line (curved line) directions falls. As a result, detection accuracy for the entire surface of the CCD field is low on the average.

There is a method of calculating a pixel (x', y') at each mirror height having the same height as a mirror reference height of a predetermined pixel (x, y) based on a mirror height measured by rotating the distortion detecting mirror 13 in the two directions (orthogonal to each other), respectively, and a mirror reference height measured earlier. This method is explained with reference to FIG. 12.

Figure 12:
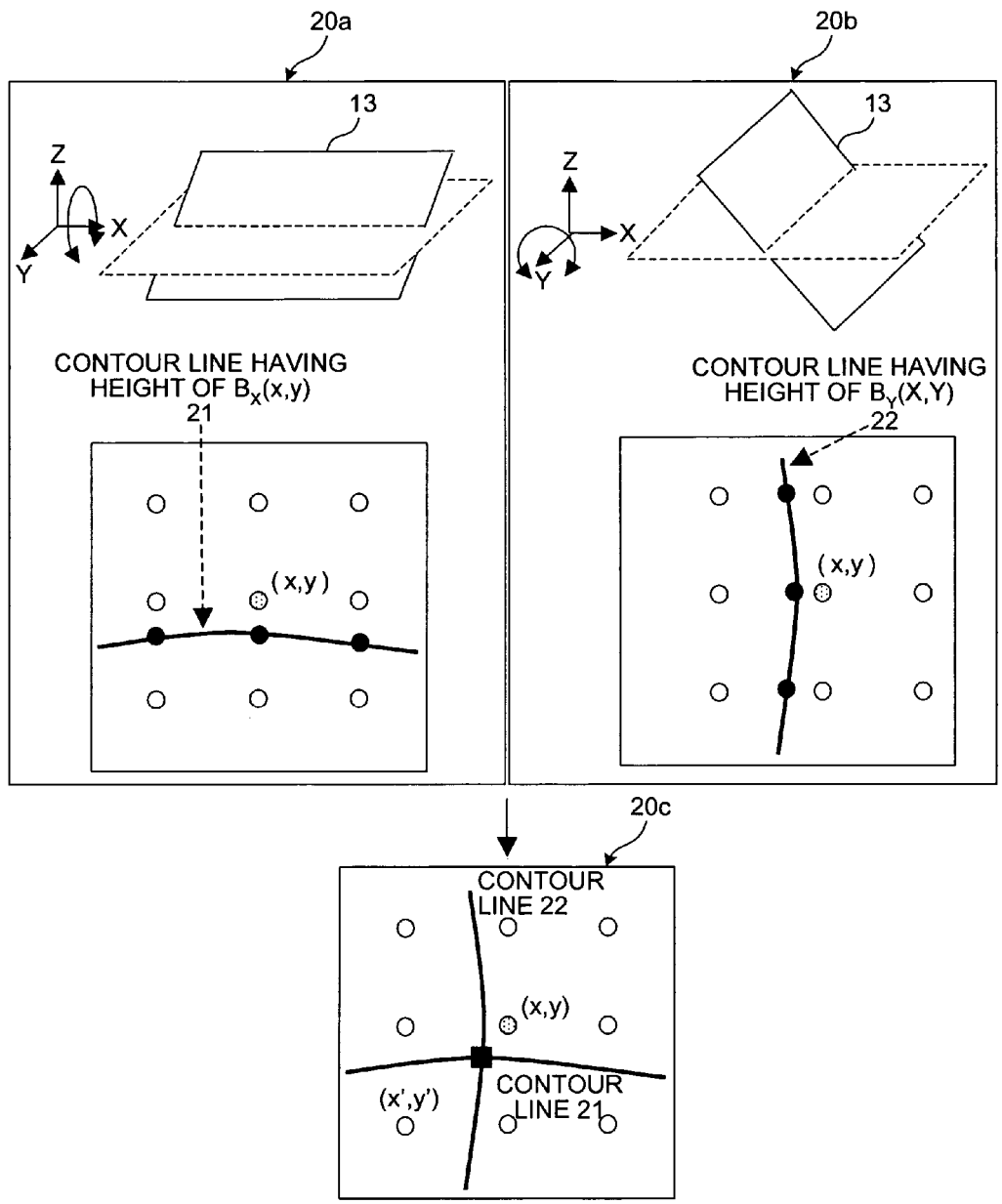
FIG. 12 is a schematic for explaining contour line calculation and intersection calculation.

FIG. 12 is a schematic for explaining contour line calculation and intersection calculation. 20a in the figure indicates rotation of the distortion detecting mirror 13 around an X axis by θx. 20b in the figure indicates rotation of the distortion detecting mirror 13 around a Y axis by θy. In the case indicated by 20a in the figure, a distortion amount only in a Y axis direction is calculated because there is no sensitivity for distortion detection in an X axis direction. In the case indicated by 20b in the figure, a distortion amount only in the X axis direction is calculated because of the same reason.

An original height Bx(x, y) of the mirror shown in 20a in FIG. 12 is calculated by rotating a reference mirror height B(x, y) around the X axis by θx according to geometrical transformation. Concerning a pixel (x, y), a contour line 21 at the height Bx(x, y) is calculated by detecting and fitting a group of coordinates (black dots in the figure) having the same height as Bx(x, y) in the X axis direction. Note that (x, y) in the figure takes an integer value because (x, y) indicates a pixel position. However, positions of the group of coordinates indicated by the black dots are accurately calculated as real numbers by using the interpolation method from height of a pixel near a pixel having height closest to Bx(x, y).

Note that simple polynomial approximation according to the method of least squares may be used as such fitting or black dot positions may be calculated by fitting the positions with a prediction formula for optical distortion aberration. It is possible to reduce influences of height noise and unexpected noise, which are added to pixels at random, on the average by performing fitting.

Similarly, as shown in 20b in FIG. 12, a contour line 22 deformed in the X axis direction is calculated by rotating the distortion detecting mirror 13 around the Y axis by θy. As shown in 20c in FIG. 12, an intersection (x', y') of the contour line 21 and the contour line 22 and stored in the correction table 12a as a position to which (x, y) is moved because of distortion. Note that, although the above description is about only one pixel at (x, y) in FIG. 12, it is also possible that contour lines 21 and the contour lines 22 are calculated for all pixels and calculated intersections are stored in the correction table 12a. Consequently, it is possible to correct a distortion amount in the entire CCD field.

Referring back to FIG. 9, the reference-height calculating unit 11a is a processing unit that performs processing for receiving image data, which is imaged in a state in which a relative angle of the distortion detecting mirror 13 and the reference mirror 14 set near 0, from the imaging unit 16, calculating height of the distortion detecting mirror 13 itself (a mirror reference height), and passing the mirror reference height calculated to the contour-line calculating unit 11c.

Note that, as described above, the mirror reference height calculated by the reference-height calculating unit 11a is measured by the high-precision interferometry after detecting large distortion with the conventional method and, then, removing the large distortion detected in advance.

The height measuring unit 11b is a processing unit that performs processing for receiving image data, which are imaged in a state in which a relative angle of the distortion detecting mirror 13 and the reference mirror 14 in the relation shown in 20a and 20b in FIG. 12, from the imaging unit 16, calculating a mirror height of the distortion detecting mirror 13, and passing the mirror height calculated to the contour-line calculating unit 11c.

The contour-line calculating unit 11c performs processing for receiving the mirror reference height calculated by the reference-height calculating unit 11a, receiving the two mirror heights measured by the height measuring unit 11b, receiving relative angles when the height measuring unit 11b performs measurement at the respective relative angles from the mirror actuating unit 15, calculating the contour lines indicated by 21 and 22 in FIG. 12, and passing the contour lines calculated to the intersection calculating unit 11d. Note that such relative angles may be included in data of the mirror height received from the height measuring unit 11b and received.

The intersection calculating unit 11d is a processing unit that performs processing for calculating an intersection from a pair of contour lines (e.g., 21 and 22 in FIG. 12) calculated by the contour-line calculating unit 11c and storing each intersection corresponding to each pixel in the correction table 12a of the storing unit 12 by performing such calculation processing in an entire image. The distortion correcting unit 11e is a processing unit that corrects distortion included in the image data passed from the imaging unit 16 and outputs the image data after correction to the output unit 17.

The storing unit 12 is a storing unit that is constituted by a storage device like a hard disk drive (HDD) and stores correction information including the intersection information passed from the intersection calculating unit 11d of the control unit 11. The correction table 12*a* is a table that holds the intersection corresponding to each pixel for all pixels.

The distortion detecting mirror 13 is a mirror having precise planarity to be an object of height measurement. The reference mirror 14 is a mirror used in height measurement for the distortion detecting mirror 13. The mirror actuating unit 15 is an actuating unit that performs rotation and translation of the distortion detecting mirror 13 and the reference mirror 14.

The imaging unit 16 is a device like a CCD camera that performs processing for imaging image data of an object to be measured and passing the image data to the control unit 11. The output unit 17 is an output device for displaying image data after distortion correction and outputting the image data to an external apparatus.

Figure 10:
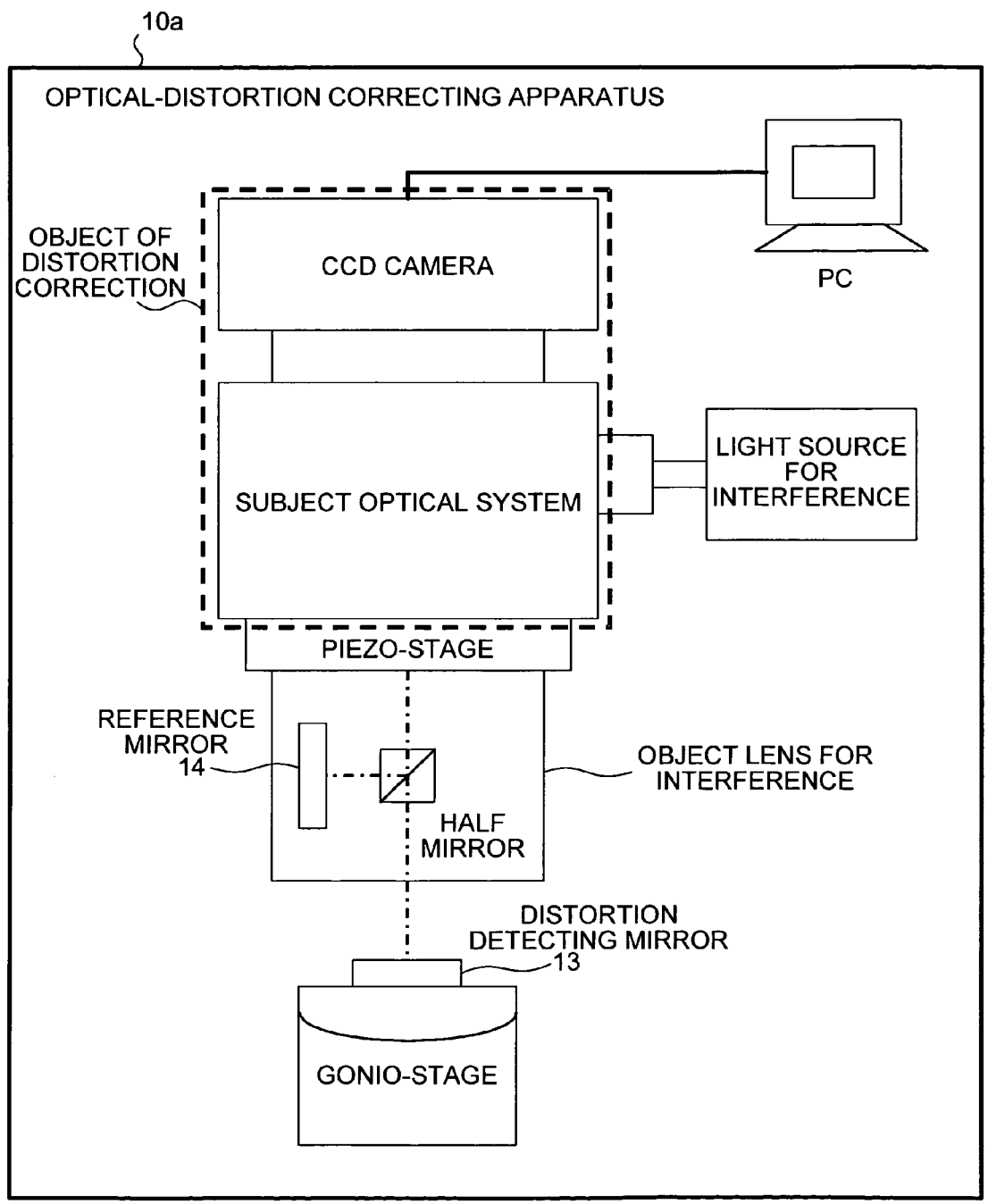
FIG. 10 is a schematic of the optical-distortion correcting apparatus.

FIG. 10 is schematic of the optical-distortion correcting apparatus. An optical-distortion correcting apparatus 10*a* shown in FIG. 10 detects and corrects distortion for a CCD camera and a subject optical system indicated by a square dotted line.

The optical-distortion correcting apparatus 10*a* includes such a subject optical system, an object lens for interference including the reflection mirror and the half mirror for distortion detection, a piezo-stage for performing the phase shift method by changing an optical path difference between the reference mirror 14 and the distortion detecting mirror 13, a gonio-stage for changing an angle of the distortion detecting mirror 13, a monochromatic light source for interference for causing interference, and a Personal Computer (PC) for detecting distortion from an interference image outputted from the CCD camera and correcting the distortion. Note that the control unit 11 and the storing unit 12 shown in FIG. 9 are included in the PC.

FIG. 13 is a schematic for explaining optical distortion correction according to a correction table.

When distortion correction is performed using the optical-distortion correcting apparatus 10*a*, after calculating correction data and storing the correction data in the correction table 12*a* once, a distortion detection optical system other than the portion indicated by the square dotted line is returned to an original optical system to image a necessary image.

Since distortion is not included in the image, the image is a distorted image as shown in an upper part of FIG. 13. It is possible to perform inspection without distortion shown in a lower part of FIG. 13 by correcting a pixel position of the distorted image according to the correction table 12*a* obtained in advance.

Figure 14:
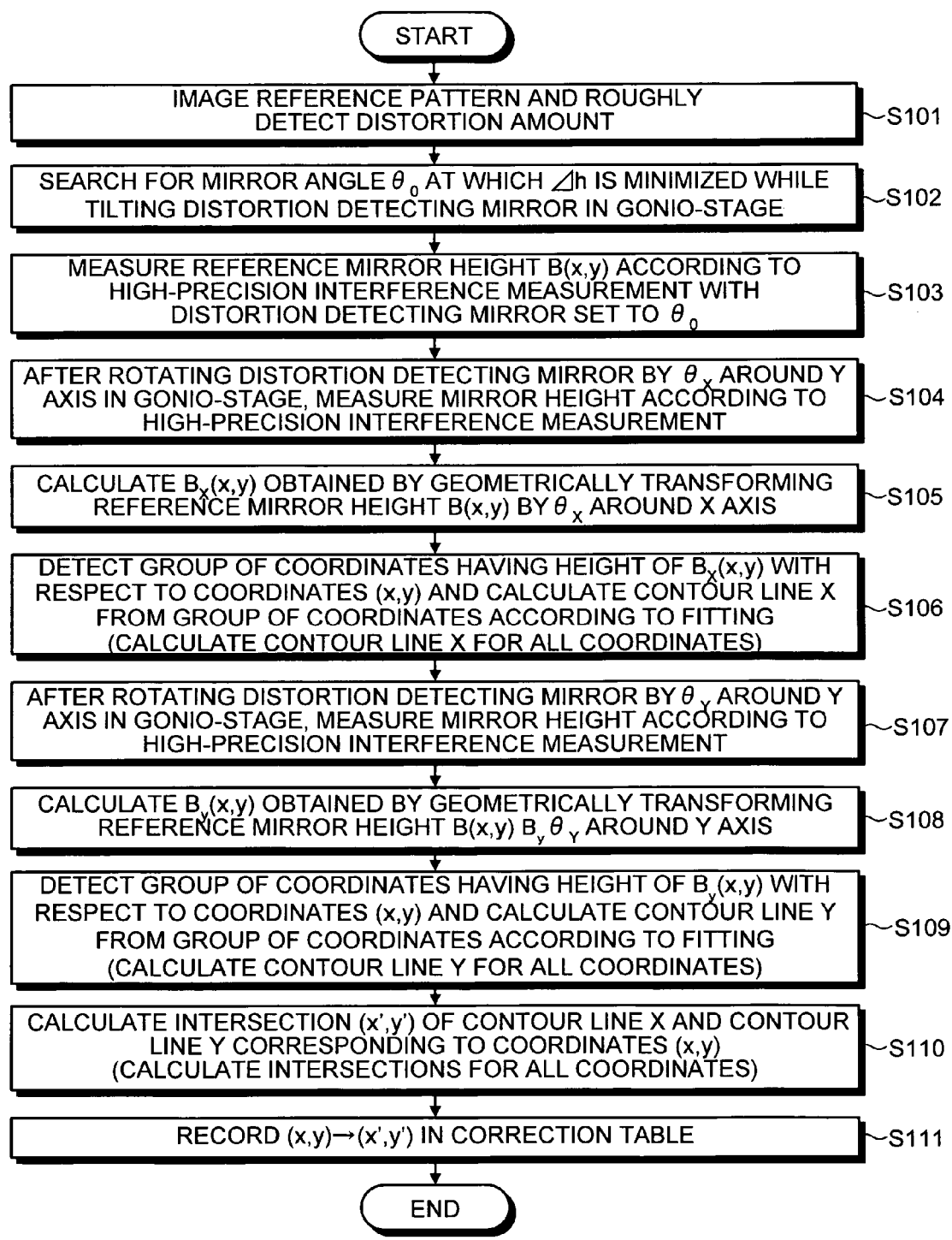
FIG. 14 is a flowchart of an optical distortion correction process.

FIG. 14 is a flowchart of an optical distortion correction process. First, the reference-height calculating unit 11*a* calculates a mirror reference height according to procedures at steps S101 to S103.

The reference-height calculating unit 11*a* images a reference pattern with the imaging unit 16 and roughly detects a distortion amount of the distortion detecting mirror 13 (step S101). Subsequently, the reference-height calculating unit 11*a* searches for a mirror angle $\theta_0$ at which $\Delta h$ (the shape error described above) is minimized while tilting the distortion detecting mirror 13 in the gonio-stage (step S102). The reference-height calculating unit 11*a* sets an angle of the distortion detecting mirror 13 to the angle $\theta_0$ searched and measures a reference mirror height B(x, y) according to precision interference measurement (step S103). Consequently, the reference-height calculating unit 11*a* calculates a mirror reference height.

The height measuring unit 11*b* and the contour-line calculating unit 11*c* receive image data in a state in which the distortion detecting mirror 13 is rotated around the X axis and the Y axis in the gonio-stage from the imaging unit 16 and calculate a distortion amount in the Y axis direction (steps S104 to S106) and calculates a distortion amount in the X axis direction (steps S107 to S109).

First, the height measuring unit 11*b* measures a mirror height according to precision interference measurement after rotating the distortion detecting mirror 13 around the X axis by $\theta x$ in the gonio-stage (step S104). Subsequently, the height measuring unit 11*b* calculates Bx(x, y) obtained by geometrically transforming the reference mirror height B(x, y) by $\theta x$ around the X axis (step S105). The contour-line calculating unit 11*c* detects a group of coordinates having the height of Bx(x, y) with respect to the coordinates (x, y) and calculates a contour line X from the group of coordinates detected according to fitting (step S106). Note that, at step S106, the contour-line calculating unit 11*c* calculates the contour lines X for all the coordinates.

The height measuring unit 11*b* measures a mirror height according to precision interference measurement after rotating the distortion detecting mirror 13 around the Y axis by $\theta y$ in the gonio-stage (step S107). Subsequently, the height measuring unit 11*b* calculates By(x, y) obtained by geometrically transforming the reference mirror height B(x, y) by $\theta y$ around the Y axis (step S108). The contour-line calculating unit 11*c* detects a group of coordinates having the height of By(x, y) with respect to the coordinates (x, y) and calculates a contour line Y from the group of coordinates detected according to fitting (step S109). Note that, at step S109, the contour-line calculating unit 11*c* calculates the contour lines Y for all the coordinates.

Subsequently, the intersection calculating unit 11*d* calculates an intersection of the contour line X and the contour line Y corresponding to the coordinates (x, y) (step S110). Note that, at step S109, the contour-line calculating unit 11*c* calculates intersections for all the coordinates. The intersection calculating unit 11*d* records an indication that (x, y) should be corrected to (x', y') in the correction table 12*a* (step S111) and ends the processing.

In the embodiment described above, a distortion amount is measured by calculating "the movement amount of height data" shown FIG. 4. However, distortion in a height direction may be corrected by calculating a "distortion factor" shown in FIG. 15. Consequently, when a measuring machine to be an object of correction is an interference system, it is possible to efficiently correct height distortion.

Figure 15:
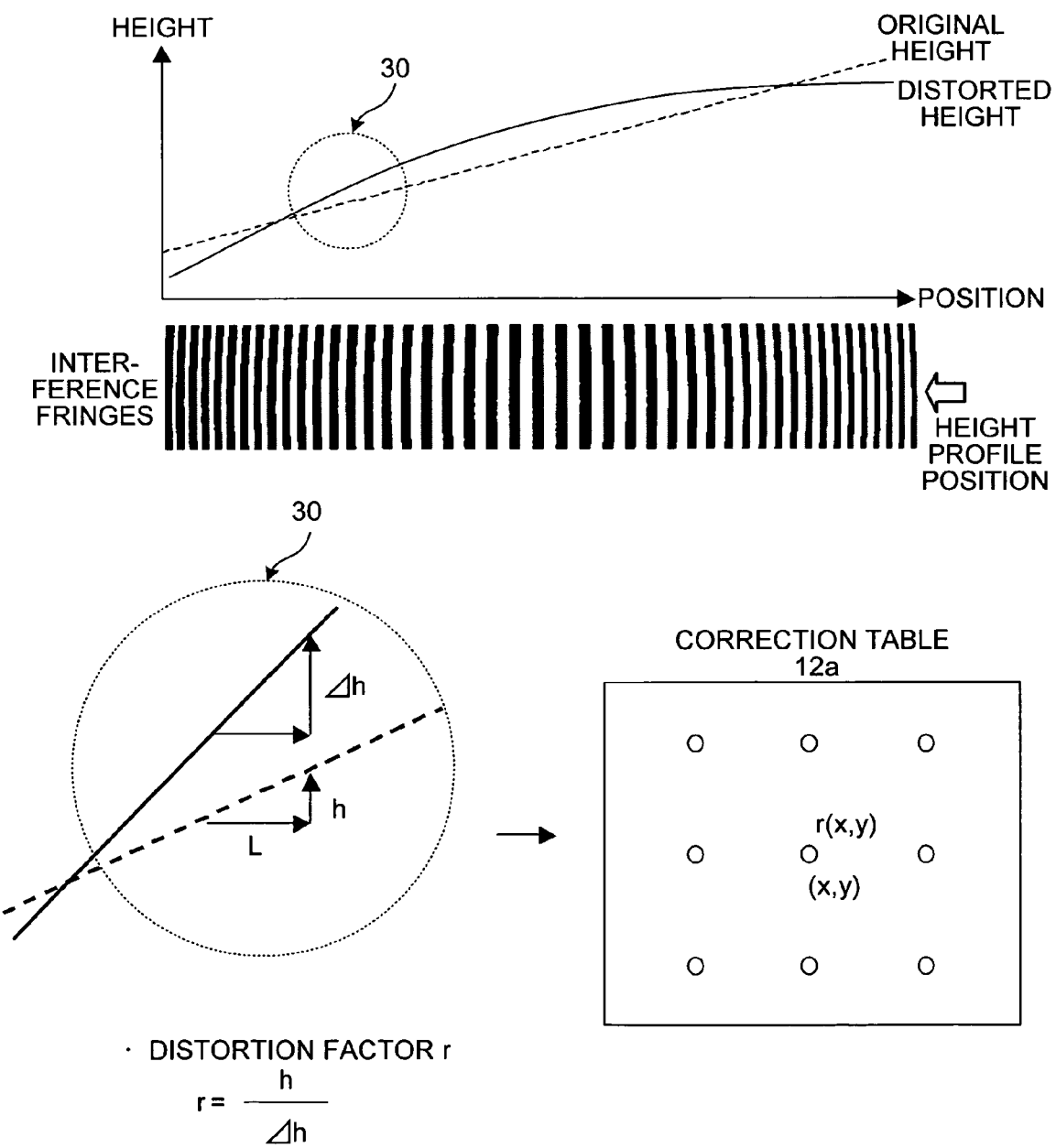
FIG. 15 is a schematic for explaining optical distortion correction according to a correction table including a distortion factor.

FIG. 15 is a schematic for explaining optical distortion correction according to a correction table including a distortion factor. As indicated by a portion 30 in the figure, a ratio $r=(h/\Delta h)$ of a change in an original height in a predetermined section h and a change in distorted height $\Delta h$ is calculated and recorded in the correction table 12*a*. If a change in height due to distortion is $\Delta h'$, it is possible to calculate the original height as $h'=r\Delta h'$ using r in a correction table 12*b*.

Figure 16:
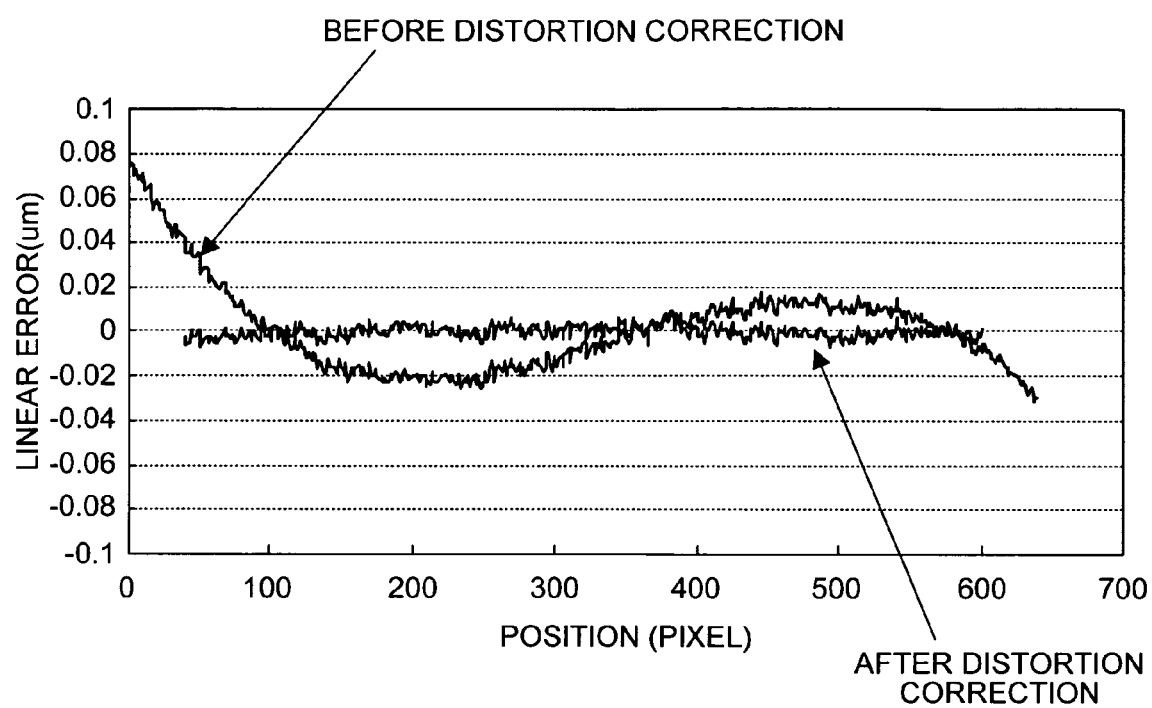
FIG. 16 is a schematic for explaining an effect of distortion correction in interference measurement.

In this way, the optical-distortion correcting apparatus and the optical-distortion correcting method according to the present invention can precisely detect and correct optical distortion in a correction object. An effect of distortion correction in interference measurement is shown in FIG. 16. As shown in FIG. 16, a linear error noticeable before distortion correction converges near 0 by using the optical-distortion correcting apparatus and the optical-distortion correcting method.

As described above, in this embodiment, the reference-height calculating unit calculates an original height of the distortion detecting mirror in a state in which the distortion detecting mirror and the reference mirror are set in substantially perpendicular to each other. The height measuring unit measures mirror heights in a state in which the distortion detecting mirror is tilted in the X axis and the Y axis directions. The contour-line calculating unit calculates a pair of contour lines based on a pair of mirror heights measured by the height measuring unit. The intersection calculating unit calculates an intersection of such contour lines to thereby store coordinates to which height of predetermined coordinates are moved by distortion in the correction table. The distortion correcting unit corrects the distortion using the correction table. Thus, it is possible to perform precise measurement by precisely removing an influence of distortion from an interferometer or a measuring machine that perform precise measurement.

It is possible to realize the optical distortion correction process explained in the embodiment by executing a program having the functions of the respective processing units of the control unit 11 shown in FIG. 9 with a computer. In this case, such a program is stored in the computer such as the PC shown in FIG. 10 in advance.

Note that it is not always necessary to store such a program in the computer in advance. For example, the program may be stored in a computer-readable removable storage-medium, such as a flexible disk (FD), a compact disk-read-only memory (CD-ROM), and a magneto-optical disk, or in an external computer (server) connected to the computer via a public line, the Internet, a local area network (LAN), and a wide area network (WAN).

According to the embodiments described above, it is possible to precisely detect optical distortion and to precisely perform optical distortion correction for removing the optical distortion detected.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for correcting optical distortion, in an optical image that is caused due to distortion in an optical system imaging the optical image comprising:
   a distortion detecting mirror;
   a reference mirror that generates an interfering light interfering with light reflected from the distortion detecting mirror by reflecting the light from the light source;
   a mirror control unit that controls a relative angle between an imaginary plane substantially perpendicular to a surface of the reference mirror and a surface of the distortion detecting mirror;
   a reference surface determining unit that determines a reference surface corresponding to a height of the distortion detecting mirror when the mirror control unit sets the relative angle to zero in substance;
   a distortion detecting unit that detects the optical distortion corresponding to a measurement height of the surface of the distortion detecting mirror by measuring relative heights of respective lattice points on the surface of the distortion detecting mirror from the reference surface determined by the reference surface determining unit, based on interference between the light reflected from the distortion detecting mirror and the interfering light generated by the reference mirror when the mirror control unit sets the relative angle to an angle other than zero; and
   a correcting unit that corrects the optical distortion detected by the distortion detecting unit.

2. The apparatus according to claim 1, wherein the distortion detecting unit including:
   a contour-line calculating unit that calculates a first contour-line on the distortion detecting mirror obtained by connecting points whose relative heights from the reference surface are identical to a relative height of a target grating point when the distortion detecting mirror is revolved about an axis, and calculates a second contour-line on the distortion detecting mirror obtained by connecting points whose relative heights from the reference surface are identical to the relative height when the distortion detecting mirror is revolved about another axis; and
   a storing unit that stores difference between an intersection of the first contour-line and the second contour-line and the target grating point as the optical distortion at the target grating point, and wherein
   the correcting unit corrects the optical distortion by replacing data of a pixel in the optical system image with data of the intersection at a grating point corresponding to a position of the pixel.

3. The apparatus according to claim 2, wherein the contour-line calculating unit calculates the first contour-line and the second contour-line according to fitting by polynomial approximation using a plurality of relative heights.

4. The apparatus according to claim 2, wherein the contour-line calculating unit calculates the first contour-line and the second contour-line according to fitting by an optical distortion aberration curve.

5. The apparatus according to claim 1, wherein the reference surface determining unit including a preprocessing unit that obtains a two-dimensional image of a regular pattern in advance to roughly calculate a rough reference height of the reference surface by measuring positional displacement of the regular pattern in the two-dimensional image and
   determines the reference surface based on the rough reference height.

6. A method of correcting optical distortion, in an optical image that is caused due to distortion in an optical system imaging the optical image comprising: controlling a relative angle between an imaginary plane substantially perpendicular to a surface of a reference mirror and a surface of a distortion detecting mirror, the distortion detecting mirror reflecting light from a light source and the reference mirror generating an interfering light interfering with light reflected from the distortion detecting mirror by reflecting the light from the light source mirror;
   determining a reference surface corresponding to a height of the distortion detecting mirror when the relative angle is substantially zero;
   setting the relative angle to an angle other than zero;
   detecting the optical distortion corresponding to a measurement height of the surface of the distortion detecting mirror by measuring relative heights of respective lattice points on the surface of the distortion detecting mirror from the reference surface based on interference between the light reflected from the distortion detecting mirror and the interfering light generated by the reference mirror; and
   correcting the optical distortion detected.

7. The method according to claim 6, wherein the detecting includes:
   revolving the distortion detecting mirror about an axis;
   calculating a first contour-line, on the distortion detecting mirror obtained by connecting points whose relative heights from the reference surface are identical to a relative height of a target grating point;

revolving the distortion detecting mirror about another axis;

calculating a second contour-line on the distortion detecting mirror obtained by connecting points whose relative heights from the reference surface are identical to the relative height and storing difference between an intersection of the first contour-line and the second contour-line and the target grating point as the optical distortion at the target grating point, and wherein the correcting includes correcting the optical distortion by replacing data of a pixel in the optical system image with data of the intersection at a grating point corresponding to a position of the pixel.

8. A computer-readable recording medium that stores therein a computer program for correcting optical distortion in an optical image that is caused due to distortion in an optical system imaging the optical image, the computer program making a computer execute:

controlling a relative angle between an imaginary plane substantially perpendicular to a surface of a reference mirror and a surface of a distortion detecting mirror, the distortion detecting mirror reflecting light from a light source and the reference mirror generating an interfering light interfering with light reflected from the distortion detecting mirror by reflecting the light from the light source mirror;

determining a reference surface corresponding to a height of the distortion detecting mirror when the relative angle is substantially zero;

setting the relative angle to an angle other than zero;

detecting the optical distortion corresponding to a measurement height of the surface of the distortion detecting mirror by measuring relative heights of respective lattice points on the surface of the distortion detecting mirror from the reference surface based on interference between the light reflected from the distortion detecting mirror and the interfering light generated by the reference mirror; and correcting the optical distortion detected.

9. The computer-readable recording medium according to claim 8, wherein the detecting includes:

revolving the distortion detecting mirror about an axis;

calculating a first contour-line on the distortion detecting mirror obtained by connecting points whose relative heights from the reference surface are identical to a relative height of a target grating point;

revolving the distortion detecting mirror about another axis;

calculating a second contour-line on the distortion detecting mirror obtained by connecting points whose relative heights from the reference surface are identical to the relative height; and storing difference between an intersection of the first contour-line and the second contour-line and the target grating point as the optical distortion at the target grating point, and wherein the correcting includes correcting the optical distortion by replacing data of a pixel in the optical system image with data of the intersection at a grating point corresponding to a position of the pixel.

\* \* \* \* \*